UNITED STATES PATENT OFFICE.

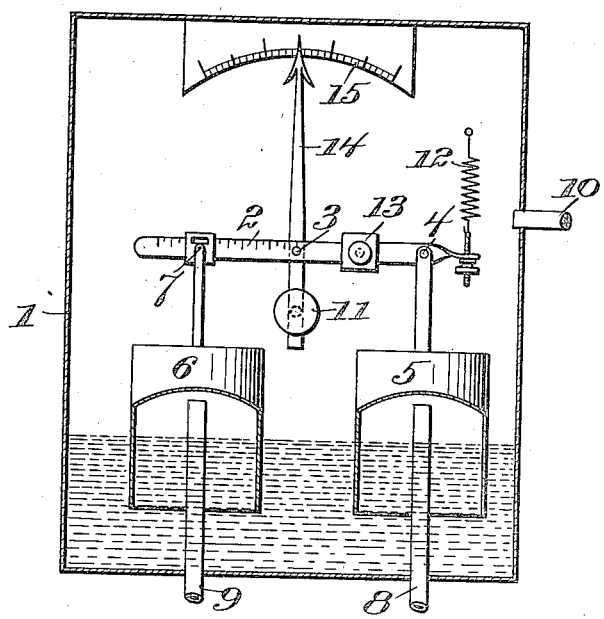

ERVIN G. BAILEY, OF NEWTON, MASSACHUSETTS, ASSIGNOR TO BAILEY METER COMPANY, A CORPORATION OF MASSACHUSETTS.

PRESSURE-RATIO GAGE.

1,220,488.   Specification of Letters Patent.   Patented Mar. 27, 1917.

Application filed March 21, 1911. Serial No. 616,019.

*To all whom it may concern:*

Be it known that I, ERVIN G. BAILEY, a citizen of the United States, residing in Newton, in the county of Middlesex and State of Massachusetts, have invented an Improvement in Pressure-Ratio Gages, of which the following description, in connection with the accompanying drawings, is a specification, like letters on the drawings representing like parts.

The present invention relates to a pressure ratio gage, and is embodied in an instrument for indicating and recording any deviations which may occur from any desired relation between two or more differences of pressure, which relation it is desired to have maintained.

While instruments embodying this invention may differ from each other, so far as relates to the specific construction and arrangement of the working parts, the principle involved is generic and depends upon the construction and location of movable abutments acted on by fluid pressure through a system of moments, so that the final action of the fluid pressure will bring about a state of equilibrium of the moving parts of the instrument whenever the desired relation exists between various pressures. The arrangement, on the other hand, is such that any deviation from the desired relation will bring about a state of unstable equilibrium of the moving parts, which will result in the movement of an indicating or recording pointer. In response to the resulting movement, however, any moments other than those resulting from the pressures applied to the instrument, such, for example, as moments produced by the resiliency of springs or diaphragms, or by the action of counterweights acting upon increasing moment arms, or by changes in the effective weight of some parts of the mechanism, due to the buoyant action of a liquid, will be automatically changed in such a way as to maintain a state of equilibrium of all moments thus brought into action around the axis of rotation of the moving parts of the mechanism. The direction and amount of motion, as indicated by this instrument, will instruct the observer as to the nature and relative degree of change which has taken place in the resistance in some part of the passageway, or the relative degree of change which has taken place in the relative rate of flow of fluid in one duct, as compared with that in another; or the relative degree of any other change affecting or effected by the flow of fluid in conduits, regardless of the actual difference which may exist between two pressures.

The drawing is a front elevation, partly in section, of an indicating instrument embodying the invention.

The instrument shown as an illustration of the invention is particularly adapted to indicate any changes in the condition of fuel beds in furnaces burning solid fuel by utilizing the various pressures which are functions of the rate of flow of air through the fuel bed, as well as functions of the resistance offered to the flow. While this instrument may be applied to other systems, it is herein shown, and will be described, as applied to fuel beds of a boiler furnace.

The instrument is provided with a closed case 1, which contains the moving parts of the instrument, and is partially filled with liquid. Within the case 1 a beam 2 is pivoted at 3, and is free to oscillate on its pivot. At the point 4 upon this beam is a pivot which supports a bell 5 suspended in the liquid. On the other side of the pivotal support 3 another bell 6, is similarly suspended in the liquid from a pivot 7 on the beam 2. Both of the bells 5 and 6 are thus sealed by the liquid, and pipes 8 and 9 communicate with the spaces inside of the two bells, respectively, the said pipes being herein shown as projecting upward through the liquid. The space above the liquid and the bells, within the case 1, is connected by a pipe 10 with the ash pit, so that the ash pit pressure acts on the outer surface of the bells. The pipe 8 communicates pressure from the fire box to the space inclosed by the bell 5, so that the difference between the pressure in the ash pit space and the pressure in the fire box is the equivalent of an unbalanced force acting downward upon the bell 5 and tending to rotate the beam 2 on its pivot 3 in a clockwise direction. The pipe 9 communicates with the uptake of the boiler, so that the unbalanced force equivalent to the difference between the pressure in the ash pit and the pressure in the uptake acts upon the bell 6 and tends to rotate the beam 2 in a counter-clockwise direction. The drop in pressure between the ash pit and the uptake is always greater than the drop in pressure between the ash pit and the fire box, and in order, therefore, that the forces due to these differences of pressure may bring about a state of equilibrium, it is necessary either to have the moment arm of the bell 6 which is the projected horizontal distance between the pivots 3 and 7 less than the moment arm of the bell 5 which is the projected horizontal distance between the pivots 3 and 4, or to have the effective area of the bell 6 less than the effective area of the bell 5. By arranging the instrument in accordance with either of these conditions, or a combination thereof, the moving parts thereof can be caused to remain in a state of equilibrium when the desired relation exists between the drop in pressure across the fuel bed and the total drop in pressure across the fuel bed plus the drop in pressure across the resistance offered by the boiler. If the instrument is adjusted as above described, it is obvious that any variation in the several pressures themselves will cause no unbalanced moment, so long as the relation between the several pressures remains unchanged. However, as soon as one difference of pressures changes with relation to the other, an unbalanced moment is produced which causes a corresponding rotation of the beam 2 on the pivot 3. This rotating movement, if, for instance, it is in a clockwise direction, will be caused by the downward movement of the bell 5, the result being that the said bell 6 becomes less submerged in the liquid, and that the bell 5, on the contrary, becomes more deeply submerged. On account of the buoyancy of the bells in the liquid, the effective weight of the bell 6 acting upon the beam through the pivot 7, will increase, while the effective weight of the bell 5, acting on the beam through the pivot 4, will decrease, thereby tending to counteract the unbalanced moment. The rotating member may also be provided with a counterpoise, 11, shown as hung from the beam 2 below the pivot 3, and the said counterpoise will be moved away from under the pivot 3 as the beam moves from its normal position, and thereby will introduce an increased moment opposing the movement of the beam. The beam is further shown as provided with a spring 12 capable of being adjusted so as to introduce a third controllable change of moment which also has the effect of counteracting any motion. The combination and opposition of these three moments will automatically counteract the increased moment due to the change in relation between the two differences in pressure, and the rotating beam will be restored to a state of equilibrium; and the amount of motion of said beam which has taken place in order to restore it to a state of equilibrium will indicate the relative changes in the several moments.

In practice, it may be advisable to minimize or eliminate entirely some of these counteracting moments, such as the buoyancy of the bells and the resistance of the spring 12, thereby depending substantially upon the change in moment produced by the weight 11, the effective moment arm of which varies with the motion of the beam 2. In case it is desired to maintain a fuel bed in such a condition that the drop in pressure across the fuel bed will be 75% of the total drop in pressure between the ash-pit and the up-take, for any particular boiler and furnace, the pivot 7 will be placed in such a position on the beam 2 that the distance between the pivot 7 and the pivot 3 is 75% of the distance between the pivot 3 and the pivot 4, assuming that the areas of the two bells 5 and 6 are equal. The same result can be attained by changing the effective areas of the bells and making the effective area of the bell 6 75% of the effective area of the bell 5, the distance between the pivot 3 and the pivot 7 in this case being equal to the distance between the pivot 4 and the pivot 3. It is obvious that any desired relation between the areas or moment arms may be provided for by arranging the mechanism so that the moments produced by the differences of pressure will balance each other when the drop in pressure across the fuel bed bears the desired relation to the drop in pressure across the fuel bed and boiler combined. The counterpoise 13, which is shown as mounted on the beam 2, and movable toward and from the pivot 3, for purposes of adjustment, is used to balance the mechanism for any position of the pivots 4 and 7, or for any weights of the bells 5 and 6.

The pointer 14, attached to the beam 2, moves over the scale 15 and indicates whether or not the desired relation exists between the different pressures communicated to the instrument, and if the desired relation does not exist, the position of the pointer indicates in what manner and approximately to what extent the relation has changed. The variation in reading from that indicated by the normal position of the pointer is not proportional to the percentage of change of one difference of pressure to the other, but is proportional to the actual change in pressure of one difference as compared with a certain percentage of the other difference of pressure.

By introducing a partition between the different parts of this instrument, and thereby forming separate closed chambers, it is possible to apply different pressures to the spaces above each bell, respectively, such as is required when it is necessary to indicate any change from a desired relation between the velocity heads corresponding to the rate of flow of two fluids in different passageways, communicated by means of Pitot tubes, Venturi tubes, or analogous devices. It is also possible to suspend any number of bells from either end of the beam 2, so that the resultant moment produced by various pressures acting upon the several bells will oppose the sum of the moments produced by pressures acting upon the other bell or bells suspended from the beam 2 at the other side of the pivot, and the instrument will then be adapted to indicate any change in the relation of one group of pressures to another group of pressures.

In the instrument herein described, the mechanism is balanced for one position of the moving parts of the mechanism; and in that one position a state of equilibrium of the moments produced by the different operating pressures is also maintained, regardless of the intensity of such pressures, so long as a certain desired relation exists between them. Conversely, any deviation from this relation, caused by a change in one pressure not accompanied by a relative change in another pressure, will produce unbalanced moments, and will result in a corresponding movement of the mechanism which, in turn, introduces counteracting moments produced by a change in the position of different parts of the mechanism, so that equilibrium is restored. The direction and extent of movement necessary to restore equilibrium, therefore, indicates the nature and extent of any change which has taken place in the relation between the various pressures or pressure differences.

What I claim is:

A pressure ratio gage consisting of two liquid sealed bells, each of which is adapted to be acted upon by a pressure difference; a pivotally supported beam from which said bells are suspended; an indicating member connected to said beam, the proportion of the parts being such that opposed and equal moments of force are produced by said pressure differences when a constant ratio other than a ratio of one to one exists between said pressure differences, regardless of their intensities; and additional force producing devices also acting on said beam through moment arms, whereby the moments of force are varied with the movement of said beam.

In testimony whereof, I have signed my name to this specification in the presence of two subscribing witnesses.

ERVIN G. BAILEY.

Witnesses:
 JAS. J. MALONEY,
 W. E. COVENEY.